US012339602B2

(12) United States Patent
Shimosawa

(10) Patent No.: US 12,339,602 B2
(45) Date of Patent: Jun. 24, 2025

(54) IMAGE FORMING APPARATUS

(71) Applicant: CANON KABUSHIKI KAISHA, Tokyo (JP)

(72) Inventor: Kohei Shimosawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/368,105

(22) Filed: Sep. 14, 2023

(65) Prior Publication Data

US 2024/0094662 A1 Mar. 21, 2024

(30) Foreign Application Priority Data

Sep. 15, 2022 (JP) ................................ 2022-147473
Aug. 29, 2023 (JP) ................................ 2023-139391

(51) Int. Cl.
*G03G 15/16* (2006.01)

(52) U.S. Cl.
CPC ................................ *G03G 15/1615* (2013.01)

(58) Field of Classification Search
CPC . G03G 15/16; G03G 15/1605; G03G 15/1615
See application file for complete search history.

(56) References Cited

U.S. PATENT DOCUMENTS

| | | | | |
|---|---|---|---|---|
| 9,658,577 B2 * | 5/2017 | Kakehi | G03G 15/1605 | |
| 2009/0010698 A1 | 1/2009 | Maruko et al. | | |
| 2009/0304411 A1 * | 12/2009 | Mochizuki | G03G 15/1615 | 399/302 |

FOREIGN PATENT DOCUMENTS

| | | |
|---|---|---|
| JP | 10-104962 A | 4/1998 |
| JP | 2000-347517 A | 12/2000 |
| JP | 2009-015043 A | 1/2009 |
| JP | 2015-200869 A | 11/2015 |
| JP | 2015-200875 A | 11/2015 |

* cited by examiner

*Primary Examiner* — Thomas S Giampaolo, II
(74) *Attorney, Agent, or Firm* — Venable LLP

(57) ABSTRACT

An image forming apparatus includes an image bearing member, a first belt to which a toner image is transferred, a first transfer roller in contact with an inner surface of the first belt, a second belt in contact with an outer surface of the first belt, and a second transfer roller to form a nip portion between itself and the first transfer roller through the second belt. First and second stretching roller are provided upstream and downstream of the second transfer roller in a rotational direction of the second belt, respectively. The first stretching roller includes a part, at both end portions in a rotational axis direction, of which a diameter is smaller than that of a central portion. The second stretching roller includes a part, at both end portions in the rotational axis direction, of which a diameter is larger than that of a central portion.

12 Claims, 8 Drawing Sheets

(a)

(b)

IMAGE FORMING APPARATUS

FIELD OF THE INVENTION AND RELATED ART

The present invention relates to an image forming apparatus such as a copy machine, printer, facsimile machine, or a multifunctional machine provided with several of these functions, using an electrophotographic or electrostatic recording method.

In an image forming apparatus using the electrophotographic photosensitive method, etc., a toner image formed on an image bearing member such as a photosensitive drum or an intermediary transfer belt is transferred to a recording material. The toner image on the image bearing member is electrostatically transferred onto the recording material by nipping the recording material between the image bearing member and a transfer device in a transfer portion and forming a transfer electric field in the transfer portion. As a transfer device, a transfer device provided with a transfer belt which carries and conveys the recording material may be employed because of its high performance in separating the recording material from the image bearing member, etc. (Japanese Patent Application Laid-Open No. 2000-347517). The transfer device is constituted by an endless transfer belt and a plurality of stretching rollers for stretching the transfer belt. The plurality of stretching rollers include a transfer roller which is in contact with the image bearing member via the transfer belt and forms the transfer portion (transfer nip), which is an area where the image bearing member and the transfer belt are in contact with each other.

In an image forming apparatus using the transfer belt, in a case in which an image is formed on the recording material of a low stiffness such as a thin paper, deterioration of the image may occur when the recording material passes through the transfer portion. This is due to an occurrence of a wrinkle on a trailing end side of the recording material in an upstream side of the transfer portion, with respect to a conveyance direction of the recording material, and an occurrence of electrical discharge in a space between a recessed portion of the occurred wrinkle and the image bearing member.

In Japanese Patent Application Laid-Open No. 2015-200869, the following configuration is proposed. That is, a separating roller (conveyance surface forming roller), which is a stretching roller provided adjacently on the downstream side of the transfer roller with respect to a rotational direction of the transfer belt, is formed as a crown shape (normal crown shape). In addition, with respect to the rotational direction of the transfer roller, a stretching roller provided adjacently on the downstream side of the separating roller is formed as an inverted crown shape. A reason for forming as the inverted crown shape like this is to make a peripheral length of the transfer belt stretched in a central portion with respect to the rotational axis direction of the separating roller and a peripheral length of the transfer belt stretched in an end portion with respect to the rotational axis direction of the separating roller be equal. By this configuration, it is possible to obtain an effect of stretching the wrinkle of the recording material in the transfer portion since the transfer belt draws a running trace (locus) spreading from the central portion to both end portions with respect to a widthwise direction (direction approximately perpendicular to a movement direction of a surface) in the transfer portion.

The wrinkle stretching effect by forming the separating roller as crown shape as mentioned above has a positive correlation with a crown amount (difference between a maximum diameter and a minimum diameter of the separating roller) of the separating roller. Therefore, in the conventional configuration, in order to obtain a sufficient wrinkle stretching effect on the recording material, it is necessary for the separating roller to have a relatively large crown amount. In addition, in order to make the peripheral lengths of the transfer belt each stretched in the central portion and in the end portion with respect to the rotational axis direction of the separating roller be equal as described above, it is also necessary to make an inverted crown amount of the stretching roller be large in proportion to the crown amount of the separating roller.

And in order to form the running trace of the transfer belt described above to obtain a wrinkle stretching force on the recording material, it is important that the transfer belt is contacting closely to a peripheral surface of the crown shape of the separating roller and a peripheral surface of the inverted crown shape of the stretching roller. Therefore, it is necessary to impart relatively large tension to the transfer belt so as to deform the transfer belt forcibly along the peripheral surface of the crown shape and a peripheral surface of the inverted crown shape described above.

However, when the large tension is imparted to the transfer belt, a large load is applied to the transfer belt. This may shorten a service life of the transfer belt. In particular, in a case in which a rib regulating method is employed to suppress a shift of the transfer belt to the widthwise direction, when a rib is in contact with a flange, large concentrated stress is likely to be applied to a part of the transfer belt, which corresponds to the rib. And by the concentrated stress being applied to the transfer belt repeatedly as the transfer belt runs, deterioration of the transfer belt may progress. As a result, the service life of the transfer belt (durable print number) may become shorter than that of the other components which constitute the transfer device.

SUMMARY OF THE INVENTION

Thus, an object of the present invention is to obtain the wrinkle stretching effect on the recording material which is carried and conveyed by the transfer belt, and to improve durability of the transfer belt.

The above objective is achieved with an image forming apparatus according to the present invention. In summary, the present invention includes, in one aspect, an image forming apparatus comprising an image bearing member configured to bear a toner image; a first belt to which the toner image is transferred from the image bearing member; a first transfer roller provided in contact with an inner surface of the first belt and configured to form a nip portion where the toner image borne by the image bearing member is transferred to a recording material; a second belt configured to form the nip portion in contact with an outer surface of the first belt and to convey the recording material; a second transfer roller configured to form the nip portion between itself and the first transfer roller through the second belt and to transfer the toner image borne by the first belt to the recording material; a first stretching roller provided adjacently upstream of the second transfer roller with respect to a rotational direction of the second belt and configured to stretch the second belt in contact with an inner surface of the second belt; and a second stretching roller provided adjacently downstream of the second transfer roller with respect to the rotational direction of the second belt and configured to stretch the second belt in contact with the inner surface of the second belt, wherein when a line perpendicular to a line connecting a center of the first transfer roller and a center of the second transfer roller and passing through a center of the nip portion is defined as a nip line L1, a tangential line of the first stretching roller passing through the center of the nip portion and formed along the second belt is defined as a tangential line L2, a tangential line of the second stretching roller passing through the center of the nip portion and formed along the second belt is defined as a tangential line L3, an angle formed by the nip line L1 and the tangential line L2 is defined as $\varphi 1$ and an angle formed by the nip line L1 and the tangential line L3 is defined as $\varphi 2$, the first stretching roller and the second stretching roller are disposed so as to satisfy $\varphi 1 \leq 30°$, $\varphi 2 \leq 30°$, and wherein the first stretching roller includes a part, at both end portions in a rotational axis direction, of which a diameter is smaller than a diameter of a central portion in the rotational axis direction in an area where the second belt is stretched, and the second stretching roller includes a part, at both end portions in the rotational axis direction, of which a diameter is larger than a diameter of a central portion in the rotational axis direction in an area where the second belt is stretched.

According to another aspect of the present invention, there is provided an image forming apparatus comprising an image bearing member configured to bear a toner image; a first belt to which the toner image is transferred from the image bearing member; a first transfer roller provided in contact with an inner surface of the first belt and configured to form a nip portion where the toner image borne by the image bearing member is transferred to a recording material; a second belt configured to form the nip portion in contact with an outer surface of the first belt and to convey the recording material; a second transfer roller configured to from the nip portion between itself and the first transfer roller through the second belt and to transfer the toner image borne by the first belt to the recording material; a first stretching roller provided adjacently upstream of the second transfer roller with respect to a rotational direction of the second belt and configured to stretch the second belt in contact with an inner surface of the second belt, the first stretching roller including a part, at both end portions in a rotational axis direction, of which a diameter is smaller than a diameter of a central portion in the rotational axis direction in an area where the second belt is stretched; a second stretching roller provided adjacently downstream of the second transfer roller with respect to the rotational direction of the second belt and configured to stretch the second belt in contact with the inner surface of the second belt, the second stretching roller including a part, at both end portions in the rotational axis direction, of which a diameter is larger than a diameter of a central portion in the rotational axis direction in an area where the second belt is stretched; and a third stretching roller configured to stretch the second belt in contact with the inner surface of the second belt downstream of the first stretching roller and upstream of the second stretching roller with respect to the rotational direction of the second belt.

Further features of the present invention will become apparent from the following description of exemplary embodiments with reference to the attached drawings.

DESCRIPTION OF THE EMBODIMENTS

Hereinafter, an image forming apparatus according to the present invention will be described in more detail with reference to the drawings.

Embodiment 1

1. Configuration and Operation of an Image Forming Apparatus

Figure 1:
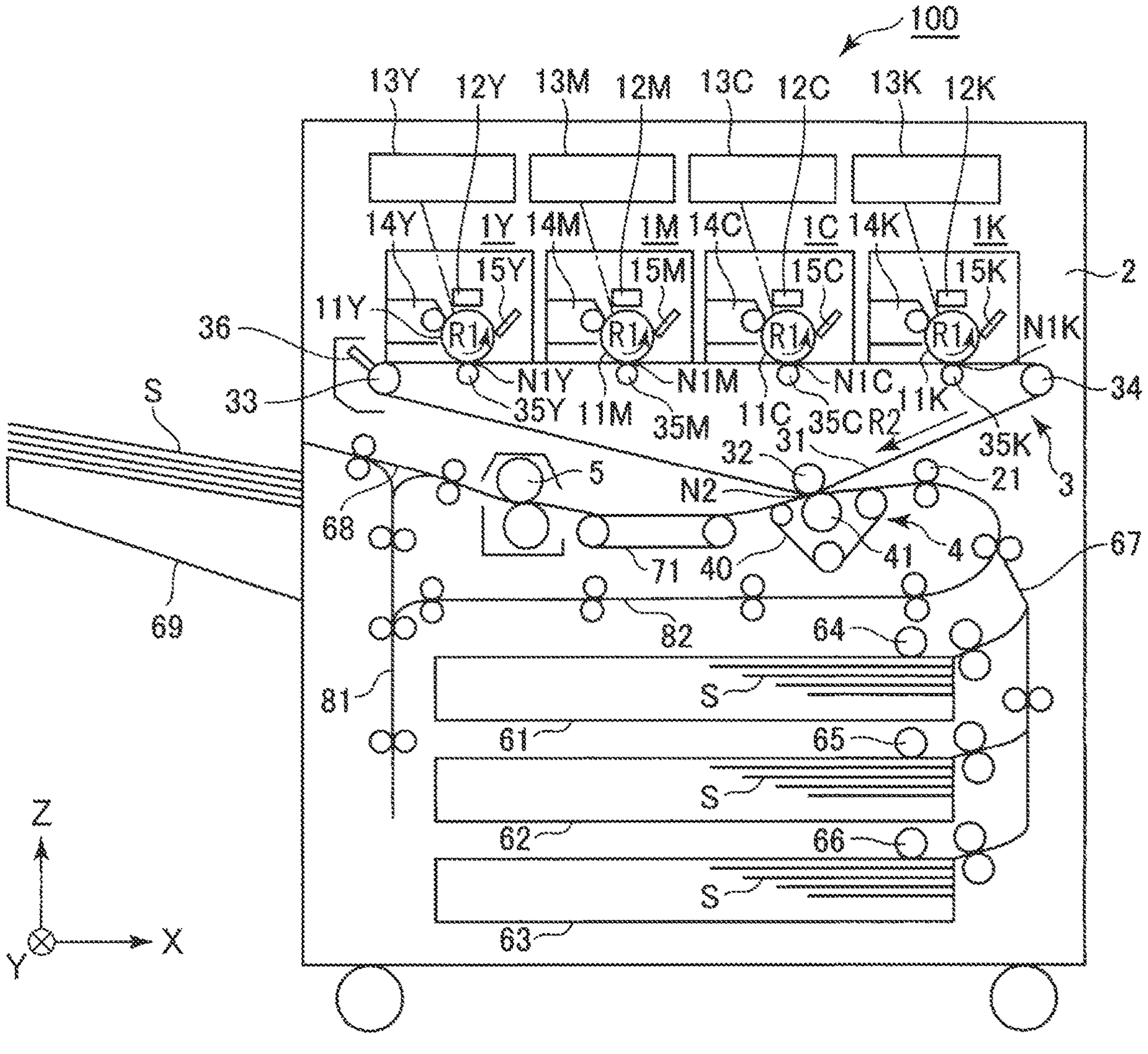
FIG. 1 is a schematic cross-sectional view of an image forming apparatus.

FIG. 1 is a schematic cross-sectional view of an image forming apparatus 100 of the present Embodiment. The image forming apparatus 100 of the present Embodiment is a printer of a tandem-type employing an intermediate transfer method, which is capable of forming a full color image using an electrophotographic method. The image forming apparatus 100 can form an image on a recording material S in response to an image signal transmitted from an external device.

Incidentally, with respect to the image forming apparatus 100 and its elements, a near side of a sheet in FIG. 1 is referred to as a "front" side and a back side of the sheet is referred to as a "rear" side. The front-rear direction connecting the front side and the rear side shall be substantially parallel to a rotational axis direction of a photosensitive drum 11, a stretching roller of an intermediary transfer belt 31, or a stretching roller of a secondary transfer belt 40, which will be described below. In addition, although the recording material S may be referred to as a "paper", the recording material S is not limited to a paper. The recording material S may be what is made of, for example, materials other than a paper or including materials other than a paper, such as a synthetic paper or a film constituted of materials mainly made of a synthetic resin, or a special paper such as metallized paper provided with a metallic layer, etc.

The image forming apparatus 100 is provided with four image forming portions 1Y, 1M, 1C, and 1K which form an image of yellow (Y), magenta (M), cyan (C), and black (K) colors, respectively. Each image forming portion 1Y, 1M, 1C and 1K is serially arranged along a movement direction of an image transfer surface, which is disposed substantially horizontal to the intermediary transfer belt 31, which will be described below. Incidentally, elements being provided with the same or corresponding functions or configurations for each color may be described in general terms by omitting Y, M, C. and K at each end of a reference numeral, which indicates that the element is for one of the colors. In the present Embodiment, the image forming portion 1 is provided with the photosensitive drum 11, a charger 12, an exposure device 13, a developing unit 14, and a drum cleaning device 15, etc., which will be described below.

The photosensitive drum 11, which is a rotatable drum-shaped (cylindrical) photosensitive member (electrophotographic photosensitive member) as a first image bearing member, is driven and rotated in a direction of an arrow R1 (counterclockwise direction) in FIG. 1. A surface of the rotating photosensitive drum 11 is uniformly charged to predetermined potential of predetermined polarity (negative polarity in the present Embodiment) by the charger 12 as a charging means. The charged surface of the photosensitive drum 11 is scanned and exposed by the exposure device (laser scanner) 13 as an exposure means which irradiates with image light according to image information, and an electrostatic latent image (electrostatic image) is formed on the photosensitive drum 11. The electrostatic latent image formed on the photosensitive drum 11 is developed (visualized) by supplying toner as a developer by the developing unit 14 as a developing means, and a toner image is formed on the photosensitive drum 11. In the present Embodiment, the toner charged with the same polarity as charging polarity of the photosensitive drum 11 (negative polarity in the present Embodiment) adheres to an exposed portion (image portion) on the photosensitive drum 11 where an absolute value of potential is decreased due to the exposure in accordance with the image information after being uniformly charged (reversal development method). In the present Embodiment, the normal charging polarity of the toner, which is a main charging polarity of the toner during the development, is negative polarity.

The intermediary transfer belt 31, which is an intermediary transfer member constituted by a rotatable endless belt, as a second image bearing member, is provided opposite to the four photosensitive drums 11. The intermediary transfer belt 31 is stretched by a driving roller 33, a tension roller 34, and a secondary transfer opposite roller 32 as a plurality of stretching rollers (supporting rollers). In the present Embodiment, the intermediary transfer belt 31 includes a base layer formed by using a resin material such as polyimide or polycarbonate and a surface layer formed by using a rubber material. The intermediary transfer belt 31 rotates (circulates) in a direction of an arrow R2 (clockwise direction) in FIG. 1 by driving force transmitted as the driving roller 33 is driven and rotated. The tension roller 34 imparts a predetermined tension to the intermediary transfer belt 31 in a running direction of the intermediary transfer belt 31. The secondary transfer opposite roller (secondary transfer inner roller) 32 forms a secondary transfer portion N2, which will be described below, together with a secondary transfer roller (secondary transfer outer roller) 41, which will be described below. On an inner peripheral surface side of the intermediary transfer belt 31, primary transfer rollers 35Y, 35M, 35C and 35K, which are roller-shaped primary transfer members as primary transfer means, are provided corresponding to each of the photosensitive drums 11Y, 11M, 11C and 11K, respectively. In the present Embodiment, each primary transfer roller 35Y, 35M, 35C and 35K is provided at a position opposite to one of the photosensitive drums 11Y, 11M, 11C and 11K, respectively. Each primary transfer roller 35 is pressed toward the corresponding photosensitive drum 11 and in contact with the photosensitive drum 11 via the intermediary transfer belt 31 to form a primary transfer portion (primary transfer nip) N1, which is an area where the intermediary transfer belt 31 and the photosensitive drum 11 are in contact with each other. The stretching rollers of the intermediary transfer belt 31 other than the driving roller 33 and each primary transfer roller 35 rotate driven by rotation of the intermediary transfer belt 31.

The toner image formed on the photosensitive drum 11 is transferred onto the rotating intermediary transfer belt 31 at the primary transfer portion N1 (primary transfer). During the primary transfer process, primary transfer voltage (primary transfer bias), which is direct current voltage having the opposite polarity to the normal charging polarity of the toner (positive polarity in the present Embodiment), is applied to the primary transfer roller 35. For example, during full-color image forming time, the yellow, magenta, cyan, and black toner images formed on the corresponding photosensitive drums 11Y, 11M, 11C, and 11K are sequentially transferred so as to be superimposed on the same image position on the intermediary transfer belt 31.

On an outer peripheral surface side of the intermediary transfer belt 31, a secondary transfer device 4 is provided at a position opposite to the secondary transfer opposite roller 32 as an opposing member. The secondary transfer device 4 is provided with the secondary transfer belt 40, which is constituted by an endless belt, and the secondary transfer roller 41, which is provided at a position opposite to the secondary transfer opposite roller 32 on the inner peripheral surface side of the secondary transfer belt 40. The secondary transfer roller 41 is pressed toward the secondary transfer opposite roller 32 and is in contact with the secondary transfer opposite roller 32 via the secondary transfer belt 40 and the intermediary transfer belt 31. As a result, the secondary transfer roller 41 forms the secondary transfer portion (secondary transfer nip) N2, which is an area where the intermediary transfer belt 31 and the secondary transfer belt 40 are in contact with each other. The toner image formed on the intermediary transfer belt 31 is transferred onto the recording material S which is nipped and conveyed between the intermediary transfer belt 31 and the secondary transfer belt 40 at the secondary transfer portion N2 (secondary transfer). During the secondary transfer process, secondary transfer voltage (secondary transfer bias), which is direct current voltage having the same polarity as the normal charging polarity of the toner (negative polarity in the present Embodiment), is applied to the secondary transfer opposite roller 32. The secondary transfer roller 41 is electrically grounded. Incidentally, the secondary transfer opposite roller 32 may be electrically grounded and a secondary transfer voltage having opposite polarity to the normal charging polarity of the toner may be applied to the secondary transfer roller 41. With regard to the secondary transfer device 4, further details will be described below.

The recording material (transfer material, recording medium, sheet) S is accommodated in sheet feeding cassettes 61, 62 and 63 as recording material accommodating portions. The recording material S is fed to a fed sheet conveyance path 67 as a recording material conveyance path as any one of sheet feeding rollers 64, 65 and 66 rotates, and is conveyed to a registration roller 21 as a conveyance member. The recording material S is conveyed to the secondary transfer portion N2 by the registration roller 21, timing of which is matched with that of the toner image on the intermediary transfer belt 31 being conveyed to the secondary transfer portion N2.

The recording material S onto which the toner image has been transferred is conveyed to a fixing device 5 as a fixing means by the secondary transfer belt 40 and a conveyance belt 71 as a conveyance member. The fixing device 5 fixes (melts and fixedly adheres) the toner image onto a surface of the recording material S by heating and pressurizing the recording material S which bears the unfixed toner image.

In a case of single-side printing mode, the recording material S on one side of which the toner image is fixed as described above is discharged (output) to a discharge tray 69 as a discharge portion through a discharging sheet conveyance path 68 as the recording material conveyance path. In a case of double-side printing mode, the recording material S on a first side of which the toner image is fixed as described above is conveyed again to the secondary transfer portion N2 for transferring the toner image on a second side of the recording material S. In other words, in the double-side printing mode, the recording material S on the first side of which the toner image is fixed is conveyed to a reversing conveyance path 81, and then is conveyed to a double-side conveyance path 82 with a leading edge and a trailing edge switched by a switchback operation performed in the reversing conveyance path 81. The recording material S conveyed to the double-side conveyance path 82 is conveyed to the registration roller 21 and then to the secondary transfer portion N2 again. And then, the toner image is transferred and fixed to the second side of the recording material S in the same manner as described above, and the recording material S is discharged to the discharge tray 69.

In addition, the toner remaining on the photosensitive drum 11 after the primary transfer process (primary transfer residual toner) is removed from the photosensitive drum 11 and collected by the drum cleaning device 15 as a cleaning means. In addition, adhesive materials such as the toner remaining on the intermediary transfer belt 31 after the secondary transfer process (secondary transfer residual toner) are removed from the intermediary transfer belt 31 and collected by a belt cleaning device 36 as a cleaning means.

Incidentally, in each image forming portion 1, the photosensitive drum 11, the charger 12, the developing unit 14, and the drum cleaning device 15 may be individually provided or collectively integrated as a cartridge, and the cartridge may be configured to be attachable to and removable from a main assembly 2 of the image forming apparatus 100. In addition, the intermediary transfer belt 31, the stretching rollers of the intermediary transfer belt 31, each primary transfer roller 35, and the belt cleaning device 36 constitute an intermediary transfer belt unit 3. The intermediary transfer belt unit 3 may be configured to be attachable to and removable from the main assembly 2 of the image forming apparatus 100.

In addition, in the present Embodiment, the image forming apparatus 100 is configured as the fed recording material S is conveyed from right to left at the secondary transfer portion N2 as shown in FIG. 1, however, it is not limited to this direction but may be configured as the fed recording material S is conveyed from left to right.

2. Configuration of the Secondary Transfer Device

Figure 2:
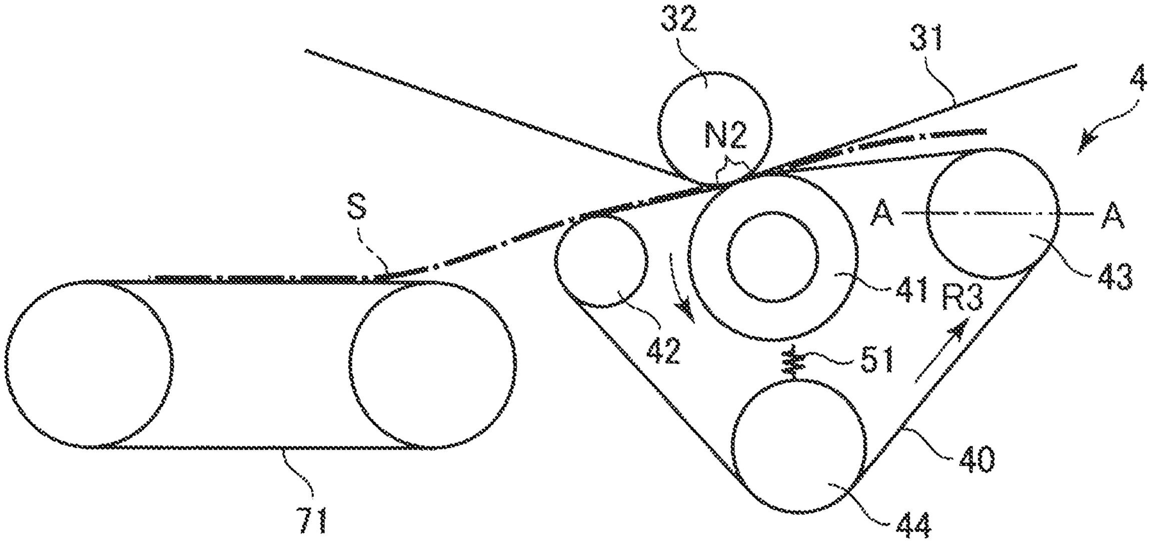
FIG. 2 is a schematic cross-sectional view of a vicinity of a secondary transfer device.

Next, a configuration of the secondary transfer device 4 in the present Embodiment will be further described. FIG. 2 is a schematic cross-sectional view illustrating a vicinity of the secondary transfer device 4 in the present Embodiment. Incidentally, with regard to the secondary transfer belt 40 and the stretching rollers of the secondary transfer belt 40, "upstream" and "downstream" refer to "upstream" and "downstream" with respect to a rotational direction (movement direction of a surface, running direction) of the secondary transfer belt 40, respectively, and may be omitted as necessary to avoid complications.

The secondary transfer device 4 includes the secondary transfer belt 40 constituted by the endless belt as a recording material carrying member. The secondary transfer belt 40 is stretched by the plurality of stretching rollers (support rollers). The secondary transfer device 4 is provided with the following four rollers as stretching rollers of the secondary transfer belt 40, provided on the inner peripheral surface side of the secondary transfer belt 40. That is, the secondary transfer roller 41 as the transfer roller (transfer member) which forms the secondary transfer portion N2, a separating roller 42 as a first stretching roller, an upstream roller 43 as a second stretching roller, and a tension roller 44 as a third stretching roller are provided. Each tension roller of the secondary transfer belt 40 is rotatably supported (held) by a frame (not shown), which constitutes the secondary transfer device 4, at both end portions with respect to the rotational axis direction, respectively. The rotational axis directions of the secondary transfer roller 41, the separating roller 42, the upstream roller 43, and the tension roller 44 are approximately parallel to each other.

The secondary transfer belt 40 may be constituted by an endless belt member which includes a layer formed of a resin material or a metal material. In the present Embodiment, the secondary transfer belt 40 is formed of a resin material such as polyimide or polycarbonate, containing an appropriate amount of carbon black as an antistatic agent to adjust volume resistivity from $1\times10^{9}$ to $1\times10^{14}$ Ω·cm. In addition, in the present Embodiment, the secondary transfer belt 40 has a single layer structure and has a thickness from 0.07 to 0.1 mm. In addition, in the present Embodiment, the secondary transfer belt 40 has a Young's modulus value which is equal to or more than 100 MPa and less than 10 GPa, which is measured by a tensile testing method (JIS K 6301). In addition, a peripheral length of the secondary transfer belt 40 is about 300 mm.

The secondary transfer roller 41 may be constituted by an elastic roller having a multi-layered structure. In the present Embodiment, the secondary transfer roller 41 is constituted by an elastic layer formed of a foamed rubber, which is a dielectric member, as a surface layer on an outer periphery of a core metal, which is the lowest layer. In the present Embodiment, hardness of the foamed rubber is from Asker C 28 degree to Asker C 50 degree. As a result, the secondary transfer roller 41 has lower hardness than the secondary transfer opposite roller 32. The secondary transfer roller 41 has a straight shape with substantially no change in diameter with respect to the rotational axis direction in an area where the secondary transfer belt 40 is stretched.

The secondary transfer roller 41 is pressed by a pressing mechanism (not shown) toward the secondary transfer opposite roller 32, and presses the secondary transfer belt 40. As a result, the secondary transfer roller 41 is in contact with the intermediary transfer belt 31, which is extended around the secondary transfer opposite roller 32, via the secondary transfer belt 40. Thus, the secondary transfer roller 41 is in pressure contact with the secondary transfer opposite roller 32 via the secondary transfer belt 40 and the intermediary transfer belt 31. At a contact portion between the secondary transfer opposite roller 32 and the secondary transfer roller 41 via the intermediary transfer belt 31 and the secondary transfer belt 40, the elastic layer of the secondary transfer roller 41, which has lower hardness than the secondary transfer opposite roller 32, is elastically deformed by the contact force. As a result, the secondary transfer portion N2, which is a contact area between the intermediary transfer belt 31 and the secondary transfer belt 40 is formed.

In an end portion with respect to the rotational axis direction of the secondary transfer roller 41, a drive means (not shown), which constitutes the secondary transfer device 4, is connected. The drive means of the secondary transfer roller 41 is constituted by a motor as a drive source and a drive transmitting member such as a gear, etc. The secondary transfer roller 41 is driven and rotated by the drive means. The secondary transfer belt 40 rotates (moves peripherally) in a direction of the arrow R3 (counterclockwise) in FIG. 1 as the secondary transfer roller 41 rotates with gripping the secondary transfer belt 40. The stretching rollers of the secondary transfer belt 40 other than the secondary transfer roller 41 rotate driven by rotation of the secondary transfer belt 40.

Incidentally, a roller to which the drive means for conveying the secondary transfer belt 40 is connected is not limited to the secondary transfer roller 41, but may be any roller which is in contact with the inner peripheral surface of the secondary transfer belt 40. Provided, from a viewpoint of stability in controlling a conveyance speed of the secondary transfer belt 40, it is preferable for the roller to which the driving means is connected to have a straight shape with substantially no change in diameter with respect to the rotational axis direction. In addition, the secondary transfer device 4 may be configured not to include the drive means but that the secondary transfer belt 40 rotates driven by the rotation of the intermediary transfer belt 31.

In the present Embodiment, potential of the same polarity as the normal charging polarity of the toner is imparted to the secondary transfer opposite roller 32 from an external power supply device (not shown) as a voltage applying means, and the secondary transfer roller 41 is electrically grounded, thereby forming a secondary transfer electric field in the secondary transfer portion N2. However, a power supply configuration to the secondary transfer portion N2 is not limited to this, but the secondary transfer opposite roller 32 may be electrically grounded and potential of the opposite polarity to the normal charging polarity of the toner may be imparted to the secondary transfer roller 41.

The separating roller 42 is provided adjacently downstream of (directly downstream of) the secondary transfer roller 41. The recording material carrying surface (conveyance surface) is formed by the separating roller 42 and the secondary transfer roller 41, which is the outer peripheral surface of the secondary transfer belt 40 which carries and conveys the recording material S. The recording material S which passes through the secondary transfer portion N2 and is electrostatically absorbed onto the recording material carrying surface of the secondary transfer belt 40 is then conveyed by the secondary transfer belt 40 and is peeled off from the secondary transfer belt 40 by utilizing curvature of the separating roller 42. As a result, the recording material S is passed from the secondary transfer belt 40 to the conveyance belt 71. Since the greater the curvature of the separating roller 42, the greater an effect of peeling the recording material S off from the secondary transfer belt 40, it is preferable that a diameter of the separating roller 42 be relatively small. And the separating roller 42 is configured to include a part, at both end portions in the rotational axis direction, of which a diameter is smaller than a diameter of a central portion in the rotational axis direction in an area where the secondary transfer belt 40 is stretched. In the present Embodiment, the separating roller 42 has a crown shape (normal crown shape) of which the diameter decreases continuously from the central portion toward both end portions in the rotational axis direction. In the present Embodiment, the separating roller 42 is constituted by a metal roller (e.g., a roller machined and formed from a round bar made of SUS, which is an example of a metal material).

The upstream roller 43 is provided adjacently upstream of (directly upstream of) the secondary transfer roller 41. And the upstream roller 43 is configured to include a part, at both end portions in the rotational axis direction, of which a diameter is larger than a diameter of a central portion in the rotational axis direction in an area where the secondary transfer belt 40 is stretched. In the present Embodiment, the upstream roller 43 has an inverted crown shape of which the diameter increases continuously from the central portion toward both end portions in the rotational axis direction. In the present Embodiment, the upstream roller 43 is constituted by a metal roller (e.g., a roller machined and formed from a round bar made of SUS, which is an example of a metal material).

Here, the inverted crown shape of the upstream roller 43 is determined according to the crown shape of the separating roller 42. If a roller having a straight shape is provided as the upstream roller 43, when the secondary transfer belt 40 is extended around the separating roller 42 having the changing diameter in the rotational axis direction, a portion having a larger diameter of the separating roller 42 is in contact with the secondary transfer belt 40 preferentially. In other words, at a portion having a smaller diameter of the separating roller 42, the peripheral length of the secondary transfer belt 40 becomes excessive, which results in surplus of the secondary transfer belt 40, and it becomes in a state in which the secondary transfer belt 40 and the separating roller 42 are not in contact with each other.

Figure 3:
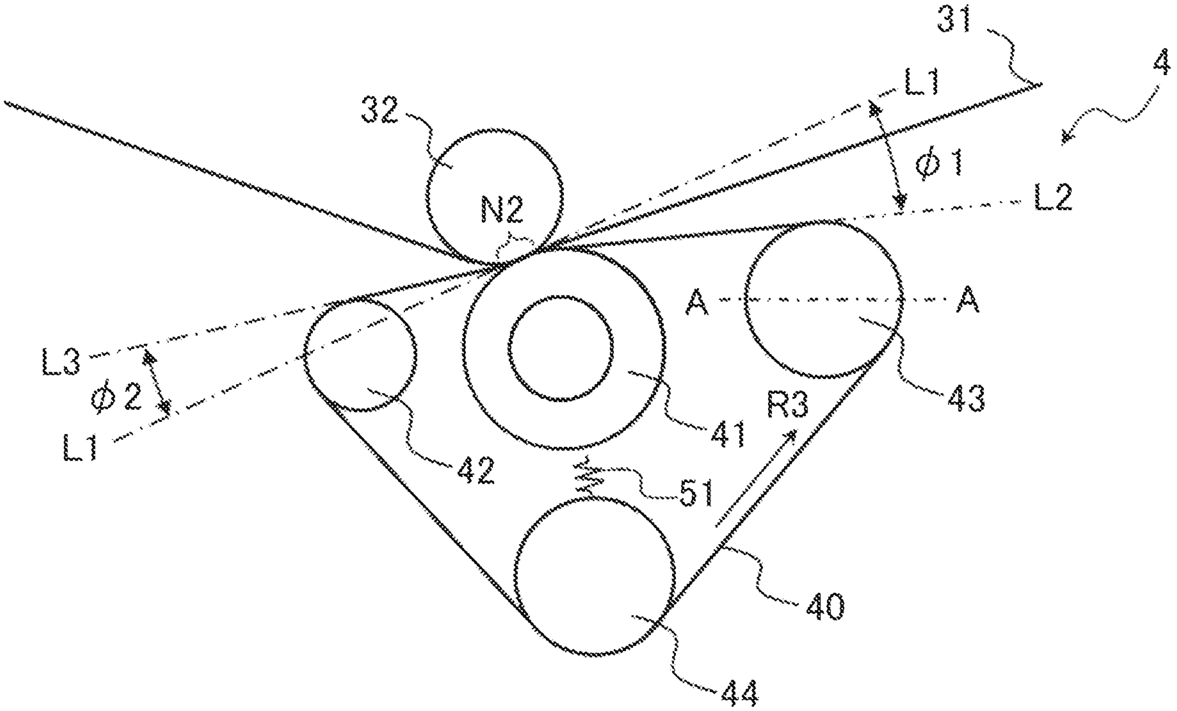
FIG. 3 is a cross-sectional view for describing an arrangement of rollers in the secondary transfer device.

Therefore, the inverted crown shape of the upstream roller 43 is set such that the peripheral length of which the secondary transfer belt 40 is stretched in the central portion with respect to the rotational axis direction of the separating roller 42 is equal to the peripheral length of which the secondary transfer belt 40 is stretched in the end portion with respect to the rotational axis direction of the separating roller 42. Thus, a roller having a crown shape (crown roller) and a roller having an inverted crown shape (inverted crown roller) are used as a set as stretching rollers of the secondary transfer belt 40. By this, it becomes possible for the secondary transfer belt 40 to be in contact with an entire area of the peripheral surfaces of the crown roller and the inverted crown roller in the rotational axis direction, respectively. Incidentally, to make the peripheral lengths be equal mentioned above means that the peripheral lengths should be approximately equal so that the secondary transfer belt is contacting closely enough to the peripheral surfaces of the above crown shape and the above inverted crown shape, and is not limited to making the peripheral lengths completely the same. For example, an error from ±0% to ±1% in the peripheral length at the above end portion with respect to the peripheral length at the above central portion may be permitted. The peripheral length of the secondary transfer belt 40 which is stretched at the central portion and the end portion with respect to the rotational axis direction of the separating roller 42, respectively, may be calculated based on the diameter of each stretching roller, crown amount, inverted crown amount, and a winding angle of the secondary transfer belt 40 about each stretching roller. FIG. 3 illustrates a positional relationship of the secondary transfer opposite roller 32, the secondary transfer roller 41, the separating roller 42, and the upstream roller 43.

As shown in FIG. 3, a "secondary transfer nip line L1" is defined as a line which is perpendicular to a center line connecting a center of the secondary transfer opposite roller 32 and a center of the secondary transfer roller 41, and is passing through a center position of the secondary transfer nip N2. And a tension surface of the secondary transfer belt 40 which is stretched between the secondary transfer roller 41 and the upstream roller 43 is defined as an "upstream belt tension surface L2". In addition, a tension surface of the secondary transfer belt 40 which is stretched between the secondary transfer roller 41 and the separating roller 42 is defined as a "downstream belt tension surface L3". The "upstream belt tension surface L2" may be regarded as a tangential line of the upstream roller 43 which passes through the center position of the secondary transfer nip N2 and is formed along the secondary transfer belt 40. In addition, the "downstream belt tension surface L3" may be regarded as a tangential line of the separating roller 42 which passes through the center position of the secondary transfer nip N2 and is formed along the secondary transfer belt 40. In addition, an angle formed by the secondary transfer nip line L1 and the upstream belt tension surface L2 is defined as "upstream belt tension angle φ1", and an angle formed by the secondary transfer nip line L1 and the downstream belt tension surface L3 is defined as "downstream belt tension angle φ2". As described below, in order to achieve an effect of the present invention, the separating roller 42 and the upstream roller 43 are arranged so that the upstream belt tension angle φ1 and the downstream belt tension angle φ2 are predetermined angles, respectively. Incidentally, in FIG. 3, the upstream belt tension angle φ1 and the downstream belt tension angle φ2 are formed between the secondary transfer nip line L1 and the upstream belt tension surface L2 and the downstream belt tension surface L3, which are positioned in a clockwise direction with respect to the secondary transfer nip line L1, respectively, however, the positions of the upstream belt tension surface L2 and downstream belt tension surface L3 are not limited to this direction. In addition, in the present Embodiment, the highest point (vertex) of the separating roller 42 is disposed lower than the highest point of the secondary transfer roller 41. In addition, the highest point (vertex) of the upstream roller 43 is disposed higher than the highest point of the secondary transfer roller 41. By these, the upstream belt tension angle φ1 and the downstream belt tension angle φ2 may be smaller.

As described in detail below, the secondary transfer device 4 in the present Embodiment may suppress deterioration of an image which occurs in the secondary transfer portion N2 when the recording material S of low stiffness is passed through by the configuration as described above.

The tension roller 44 is provided further downstream than the separating roller 42 and further upstream than the upstream roller 43. The tension roller 44 has a straight shape with substantially no change in diameter with respect to the rotational axis direction in an area where the secondary transfer belt 40 is stretched. In the present Embodiment, the tension roller 44 is constituted by a metal roller (e.g., a roller machined and formed from a round bar made of aluminum, which is an example of a metal material). And the tension roller 44 functions to impart tension (stretching force) to the secondary transfer belt 40 by being pressed toward a direction from the inner peripheral surface side to the outer peripheral surface side of the secondary transfer belt 40 by a spring (compression coil spring) 51, which is an urging member as an urging means. Since the secondary transfer belt 40 is formed of resin, which is a relatively hard material, it is necessary to impart sufficient tension to the secondary transfer belt 40 so as to deform the secondary transfer belt 40 forcibly along the peripheral surface of the crown shape of the separating roller 42 and the peripheral surface of the inverted crown shape of the upstream roller 43.

Incidentally, the stretching rollers of the secondary transfer belt 40 are not limited to only the above set in the present Embodiment. For example, in a case in which the cleaning member for collecting the toner adhered to the secondary transfer belt 40 is provided, a roller and so forth may be provided additionally at a position opposite to the cleaning member, with which the cleaning member is in contact via the secondary transfer belt 40. In addition, for example, a steering roller and so forth may be provided additionally, which controls a shift amount to a widthwise direction (direction approximately perpendicular to the movement direction of the surface) of the secondary transfer belt 40 during conveyance.

Figure 4:
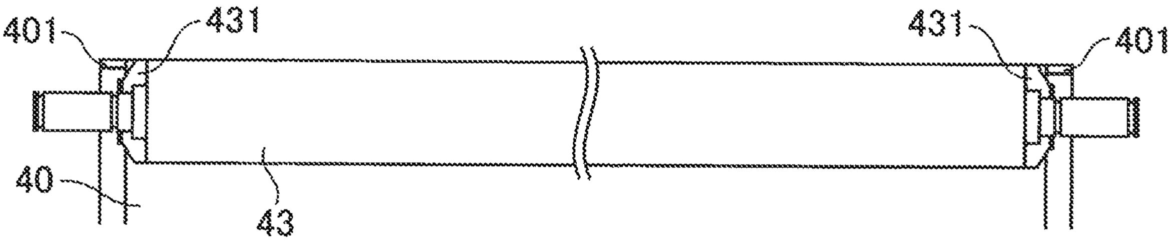
FIG. 4, part (a) and part (b), includes a cross-sectional view and an enlarged cross-sectional view for describing a rib regulating method.
Figure 4:
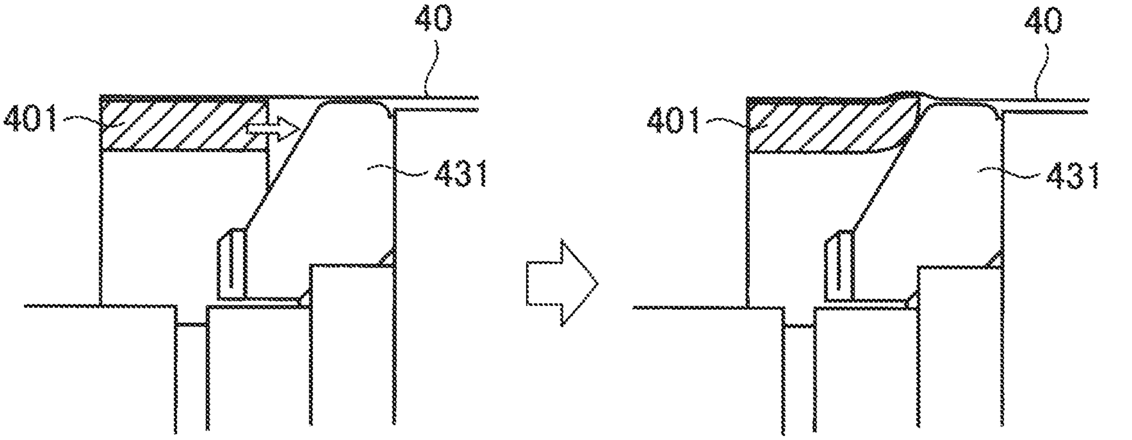

In the present Embodiment, the secondary transfer device 4 employs a rib regulating method to suppress a shift of the secondary transfer belt 40 in the widthwise direction. Hereinafter, the rib regulating method will be described. Part (a) of FIG. 4 is an A-A cross-sectional view of FIG. 2. In the present Embodiment, ribs 401 formed of an elastic material are adhered and fixed to the inner peripheral surfaces of both end portions of the secondary transfer belt 40 in the widthwise direction. In addition, in the present Embodiment, flanges 431 formed of resin are provided at positions more inside than the above ribs 401 at both ends portions of the upstream roller 43 in the rotational axis direction. In the present Embodiment, the flange 431 has a tapered shape with the rotational axis of the upstream roller 43 as a center, an outer diameter of which decreases from a center side toward an end portion side of the upstream roller 43 in the rotational axis direction. In a case in which the secondary transfer belt 40 is shifted to one side in the widthwise direction, the rib 401 is in contact with the flange 431 on the opposite side in the widthwise direction of the secondary transfer belt 40. By this, a running position of the secondary transfer belt 40 may be positioned back to a predetermined position by force pushing back to opposite side to the above shift direction being imparted to the secondary transfer belt 40 from the flange 431.

Here, part (b) of FIG. 4 is an enlarged cross-sectional view of a vicinity of an end portion of a left side of the upstream roller 43 in part (a) of FIG. 4, illustrating a behavior when the rib 401 is in contact with the flange 431. The elastic rib 401 deforms along the shape of the flange 431 as the elastic rib 401 rides up on the flange 431 due to shift force generated when the secondary transfer belt 40 moves to one side in the widthwise direction (from a left side to a right side in part (b) of FIG. 4). With the deformation, at an inside end portion of the rib 401 in the widthwise direction of the secondary transfer belt 40, the rib 401 pushes the secondary transfer belt 40 up in an outer surface direction (a direction from the inner peripheral surface side to the outer peripheral surface side). Therefore, concentrated stress is likely to be applied to a portion of the secondary transfer belt 40, which is pushed up by the rib 401. And, when the secondary transfer belt 40 runs meanderingly in the widthwise direction, deterioration of the secondary transfer belt 40 may progress because of the concentrated stress being applied repeatedly to the secondary transfer belt 40. In the worst case, fatigue failure may occur in the secondary transfer belt 40.

3. Problem Upon the Recording Material of Low Stiffness Passing Through

Figure 5:
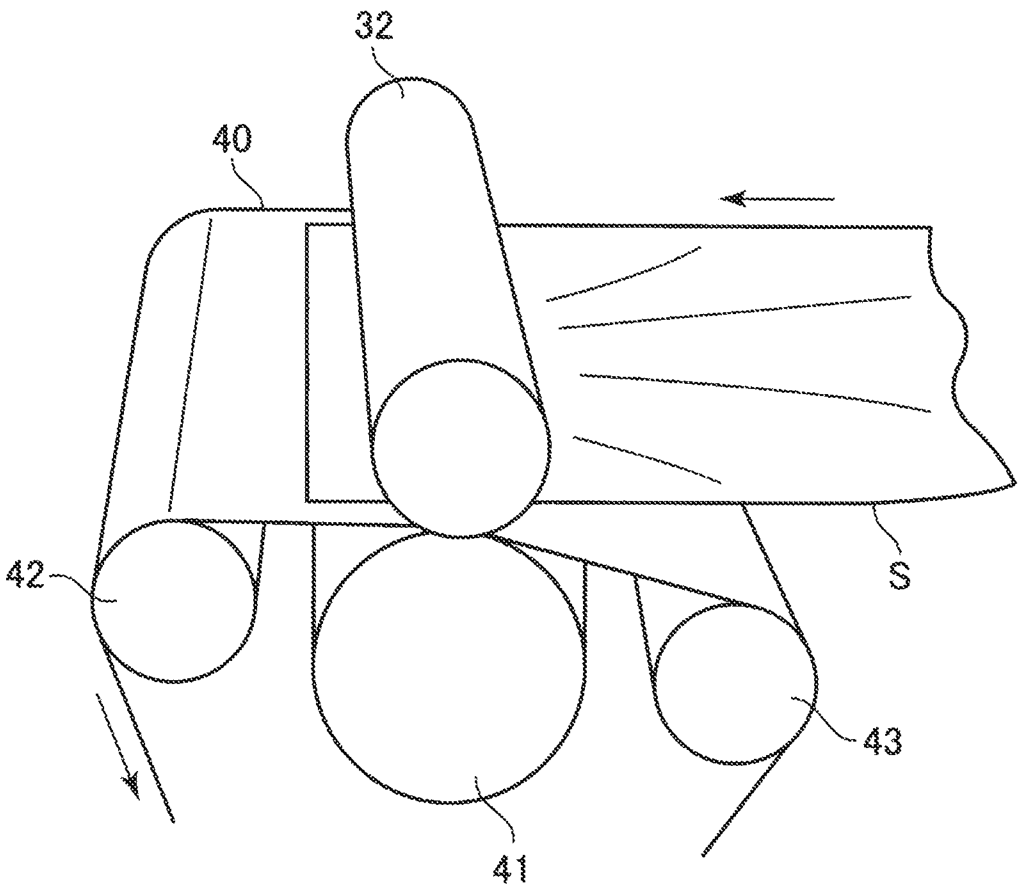
FIG. 5 is a schematic view for describing a phenomenon in which wrinkles of a recording material occur.

Next, the deterioration of the image which occurs due to the wrinkle of the recording material S will be described. FIG. 5 is a schematic diagram illustrating a phenomenon in which the wrinkle occurs on the recording material S when the recording material S of low stiffness passes through the secondary transfer portion N2, and the intermediary transfer belt 31 is omitted. Since the phenomenon of image deterioration caused by the wrinkle of the recording material S is likely to occur in the double-side printing mode, it will be described assuming the double-side printing mode.

As the recording material S on the first side of which the toner image is transferred passes through the fixing device 5, the toner image is fixed on the surface, and then the recording material S is switched back in the reversing conveyance path 81 and is conveyed again to the secondary transfer portion N2. The recording material S before passing through the fixing device 5 contains moderate moisture, but as the recording material S is heated and pressurized in the fixing device 5, the recording material S expands or contracts as the moisture inside the recording material S is lost. When an amount of moisture which leaves the recording material S varies across an entire surface of the recording material S, an amount of expansion or contraction may also vary across the entire surface of the recording material S. Therefore, the recording material S which passes through the fixing device 5 after the toner image is transferred on the first side may show an undulating profile in an uneven shape occasionally.

When the toner image is transferred on the second side, the recording material S is nipped and conveyed between the intermediary transfer belt 31 and the secondary transfer belt 40 in the secondary transfer portion N2. At this time, in the secondary transfer portion N2, force which cancels and flattens out the unevenness is applied to the recording material S. However, as the unevenness is flattened out in the secondary transfer portion N2, the wrinkle occurs on the upstream side of the secondary portion N2 with respect to the conveyance direction of the recording material S, as the recording material S tries to gather in the central portion. As a result, a large uneven profile is generated on the recording material S at a trailing end side with respect to the conveyance direction of the recording material S.

And at the upstream side of the secondary transfer portion N2 with respect to the conveyance direction of the recording material S, a small space is generated between a recessed portion of the recording material S and the intermediary transfer belt 31. Since a potential difference is generated between the intermediary transfer belt 31 and the recording material S by the secondary transfer electric field, electrical discharge occurs in the above space. By this, the toner image may not be transferred to the recording material S correctly, resulting in uneven transfer. As a result, deterioration of the printed image may occur.

4. Arrangement of the Stretching Rollers

Figure 6:
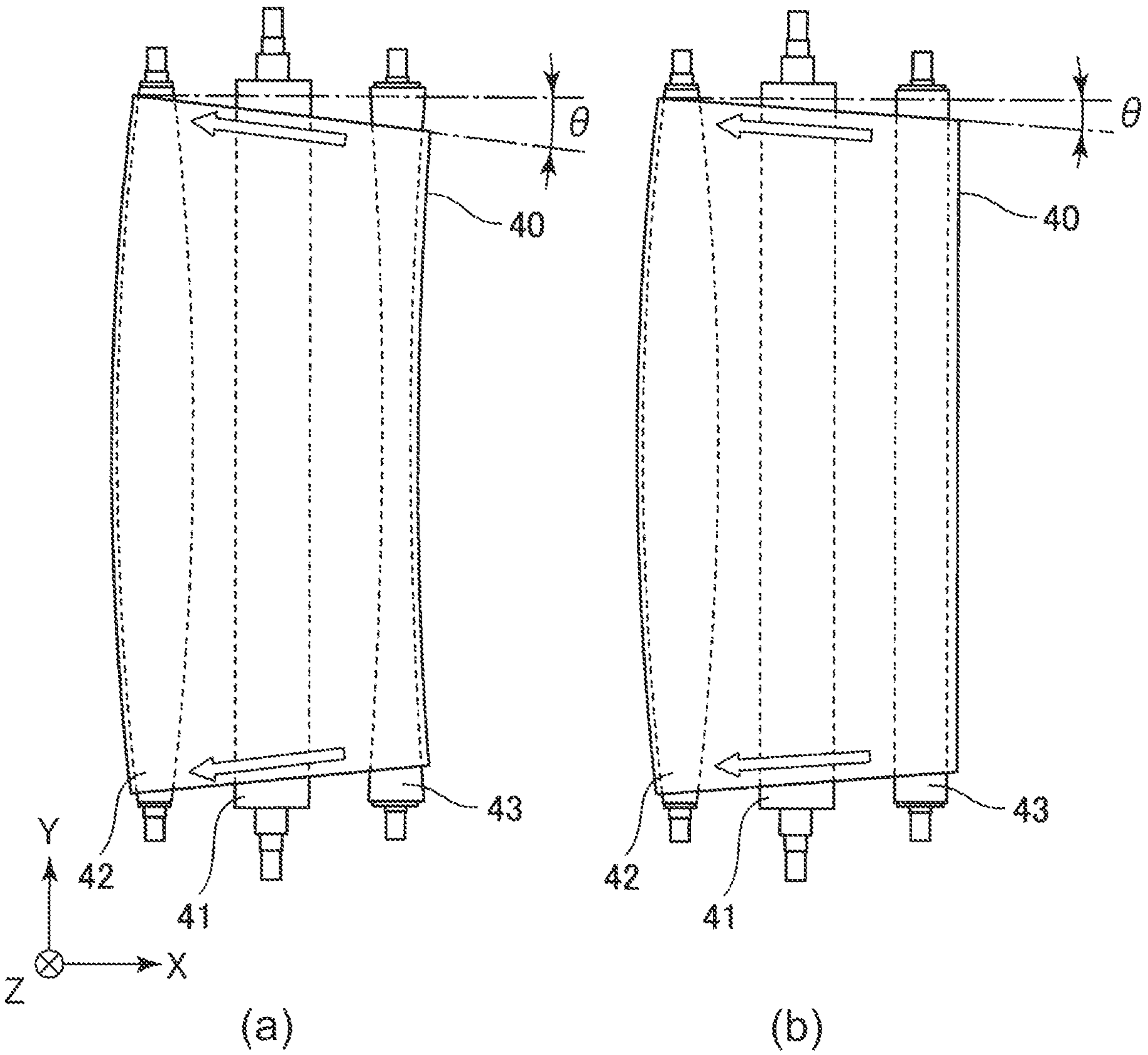
FIG. 6, part (a) and part (b), is a top view of a secondary transfer portion of an Embodiment and a Comparative Example.

Next, an effect of an arrangement of the stretching rollers to suppress the deterioration of the image caused by the wrinkle of the recording material S will be described. Part (a) of FIG. 6 is a top view of the secondary transfer device 4 in the present Embodiment, and the intermediary transfer belt 31 and the secondary transfer opposite roller 32 are omitted.

In the present Embodiment, the secondary transfer device 4 is provided with the separating roller 42 having the crown shape provided adjacently downstream of the secondary transfer roller 41 and the upstream roller 43 having the inverted crown shape provided adjacently upstream side of the secondary transfer roller 41. This configuration is referred to as a "Configuration A". In the Configuration A, a portion of the secondary transfer belt 40 of the downstream side of the secondary transfer roller 41 up to the separating roller 42 is deformed protrusion-shaped outwardly so as to follow the crown shape of the separating roller 42. On the other hand, the secondary transfer belt 40 of the upstream side of the secondary transfer roller 41 up to the upstream roller 43 is deformed concave-shaped inwardly so as to follow the inverted crown shape of the upstream roller 43. This indicates that a difference is generated in a width of the secondary transfer belt 40 between the upstream and the downstream sides due to the stress imparted from the tension roller 44, as the secondary transfer belt 40 is compressed in the widthwise direction inwardly of the secondary transfer belt 40 on the upstream side (strained in a direction from the center to the end portion of the roller axis), and is pulled outwardly in the widthwise direction of the secondary transfer belt 40 on the downstream side (strained from the end portion to the center of the roller axis). Therefore, as shown in part (a) of FIG. 6, due to the difference of the width of the secondary transfer belt 40 between the upstream side and the downstream side, the secondary transfer belt 40 runs with an angle so that the secondary transfer belt 40 spreads from the central portion to both end portions in the widthwise direction of the secondary transfer belt 40 as it goes from the upstream side to the downstream side of the secondary transfer roller 41. In other words, as shown in part (a) of FIG. 6, the secondary transfer belt 40 draws the running trace of "V-shape" as it goes from the upstream side to the downstream side of the secondary transfer roller 41. As shown in part (a) of FIG. 6, a "belt entering angle $\theta$" is defined as a running angle at the end portion in the widthwise direction of the secondary transfer belt 40 in the secondary transfer portion N2. This belt entering angle $\theta$ is, more specifically, an angle relative to the running direction (a direction approximately perpendicular to the rotational axis direction of the stretching rollers in part (a) of FIG. 6) at the end portion in the widthwise direction of the secondary transfer belt 40 in a case in which all of the stretching rollers of the secondary transfer belt 40 have straight shapes.

The recording material S which entered the secondary transfer portion N2 also exhibits a behavior spreading from the central portion to the end portion in the widthwise direction of the secondary transfer belt 40 (from inside to outside), similar to the running trace of the secondary transfer belt 40. Therefore, the force that the recording material S receives from the secondary transfer belt 40 in the secondary transfer portion N2 acts as force with a direction which stretches the wrinkle of the recording material S, which is a factor of the deterioration of the image described above. As a result, upstream of the secondary transfer portion N2 in the conveyance direction of the recording material S, it becomes possible to maintain image quality by suppressing an occurrence of the wrinkling of the recording material S, which is the factor of the deterioration of the image described above.

In particular, the wrinkle stretching effect described above is effective in a case in which the upstream belt tension angle $\varphi 1$ and the downstream belt tension angle $\varphi 2$ are small. If $\varphi 1$ is large, then an angle at which the secondary transfer belt 40 winds around the secondary transfer roller 41 becomes large at the upstream side of the secondary transfer nip N2 in the rotational direction of the secondary transfer belt 40. Since the secondary transfer roller 41 has the straight shape, in a case in which the winding angle is large, the secondary transfer belt 40, which is deformed in the concave-shaped upstream of the secondary transfer roller 41, runs along the shape of the secondary transfer roller 41 so that the concave deformation is restored. Therefore, even in the secondary transfer nip N2, the running behavior of the secondary transfer belt 40 spreading from inside to outside with respect to the widthwise direction of the secondary transfer belt 40 becomes closer to a straight direction. For this reason, the force which stretches the wrinkle of the recording material S when the material S is passing through the secondary transfer nip N2 becomes weak. The same is applied to a case in which φ2 is large. Here, to obtain the wrinkle stretching effect sufficiently, it is preferable for the upstream belt tension angle φ1, which is the angle formed between the upstream belt tension surface L2 and the secondary transfer nip line L1, and the downstream belt tension angle φ2, which is the angle formed between the downstream belt tension surface L3 and the secondary transfer nip line L1, to be small. In the present Embodiment, both the upstream belt tension angle φ1 and the downstream belt tension angle φ2 are set to be equal to or less than 30 degree. By setting the upstream belt tension angle φ1 and the downstream belt tension angle φ2 preferably to be equal to or less than 20 degree, and more preferably to be equal to or less than 10 degree, respectively, it becomes possible to obtain the larger wrinkle stretching effect.

Part (b) of FIG. 6 is atop view similar to part (a) of FIG. 6, which illustrates a configuration of a Comparative Example. In a configuration of the Comparative Example, an upstream roller 43 which has a straight shape with substantially no change in diameter with respect to the rotational axis direction is provided adjacently upstream of the secondary transfer roller 41. In addition, since it is necessary to use the crown roller and the inverted crown roller as a set, as mentioned above, in the configuration of the Comparative Example, the tension roller 44 provided on further downstream than the separating roller 42 and further upstream than the upstream roller 43 is configured to have the inverted crown shape. This configuration is referred to as a "Configuration B". The other constitutions of the Configuration B are substantially the same as the Configuration A.

Figure 7:
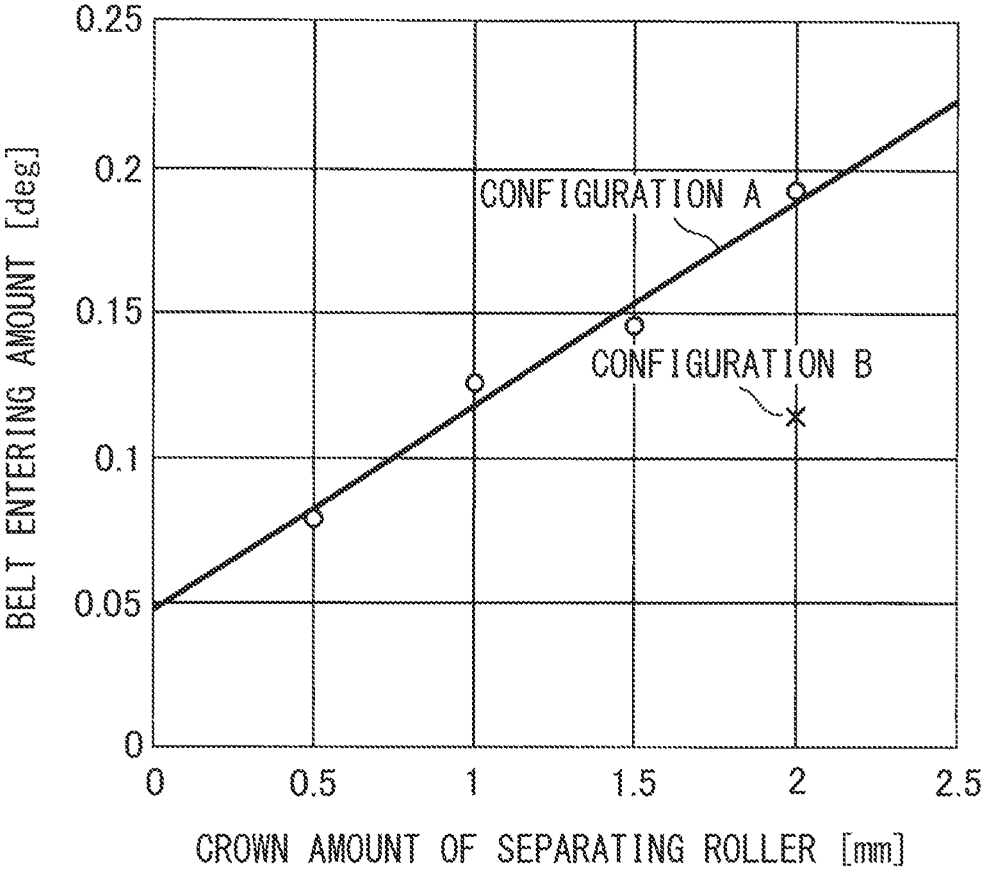
FIG. 7 is a graph illustrating a relationship between a crown amount of a separating roller and a belt entering angle.

In order to compare the wrinkle stretching effect of the recording material S between the Configuration A and the Configuration B, a simulation was performed by structural analysis by modeling the secondary transfer device 4, and then the belt entering angle θ in each configuration was calculated. FIG. 7 shows results of the calculations of the belt entering angle θ in each configuration. Specifications of elements related to the secondary transfer portion N2 and used in the calculations are shown as below.

Intermediary Transfer Belt 31

Surface layer material: Chloroprene rubber

Base layer material: Polyimide

Thickness: 355 μm

Conveyance speed: 435 mm/s

Secondary Transfer Opposite Roller 32

Surface layer material: Conductive EPDM

Diameter: 16 mm

Rubber thickness: 0.5 mm

Hardness: JIS-A 70°

Secondary Transfer Belt 40

Material: Polyimide

Thickness: 85 μm

Secondary Transfer Roller 41

Material: Conductive sponge rubber

Diameter: 24 mm

Rubber thickness: 6 mm

Hardness: Asker-C 280

Specifications of Other Rollers which are in Contact with the Inner Peripheral Surface of the Secondary Transfer Belt 40

TABLE 1

| Configuration A (Embodiment 1): | Separating roller 42 | Upstream roller 43 | Tension roller 44 |
|---|---|---|---|
| Material | SUS | SUS | Aluminum |
| Shape | Crown | Inverted crown | Straight |
| Maximum Diameter | 14 mm | 17.2 mm | 21 mm |
| Crown amount | 2.0 mm | 1.2 mm | — |

TABLE 2

| Configuration B (Comparative Example): | Separating roller 42 | Upstream roller 43 | Tension roller 44 |
|---|---|---|---|
| Material | SUS | Aluminum | SUS |
| Shape | Crown | Straight | Inverted crown |
| Maximum Diameter | 14 mm | 16 mm | 17.2 mm |
| Crown amount | 2.0 mm | — | 1.2 mm |

In FIG. 7, focusing on the results in a case of the crown amount of 2 mm, it can be found that the belt entering angle θ of the Configuration A is larger than that of the Configuration B, about 1.5 times larger. This is considered to be due to the following reason. That is, in the Configuration A, the upstream roller 43, which has the inverted crown shape, is provided adjacently upstream of the secondary transfer roller 41. As a result, the secondary transfer belt 40 in the upstream side of the secondary transfer roller 41 up to the upstream roller 43 is deformed so as to enter inward along the inverted crown shape at the central portion with respect to the rotational axis direction of the upstream roller 43. Therefore, a start position of the running angle at the end portion in the widthwise direction of the secondary transfer belt 40 is shifted inside in the widthwise direction of the secondary transfer belt 40, resulting in the larger belt entering angle θ in the secondary transfer portion N2. Thus, it can be considered that by providing the crown roller and the inverted crown roller on the directly downstream side and on the directly upstream side of the secondary transfer portion N2, respectively, the effect of the deformation of the belt due to a shape of peripheral surface of each roller may be directly obtained at the secondary transfer portion N2.

As described above, as the recording material S which entered the secondary transfer portion N2 exhibits the behavior spreading from the central portion to both end portions in the widthwise direction of the secondary transfer belt 40, similar to the running trace of the secondary transfer belt 40, it becomes possible to obtain the wrinkle stretching effect on the recording material S, which is the factor of the deterioration of the image described above. Therefore, it can be considered that a higher wrinkle stretching effect of the recording material S can be obtained in the Configuration A, which has the larger belt entering angle θ than the Configuration B.

Figure 8:
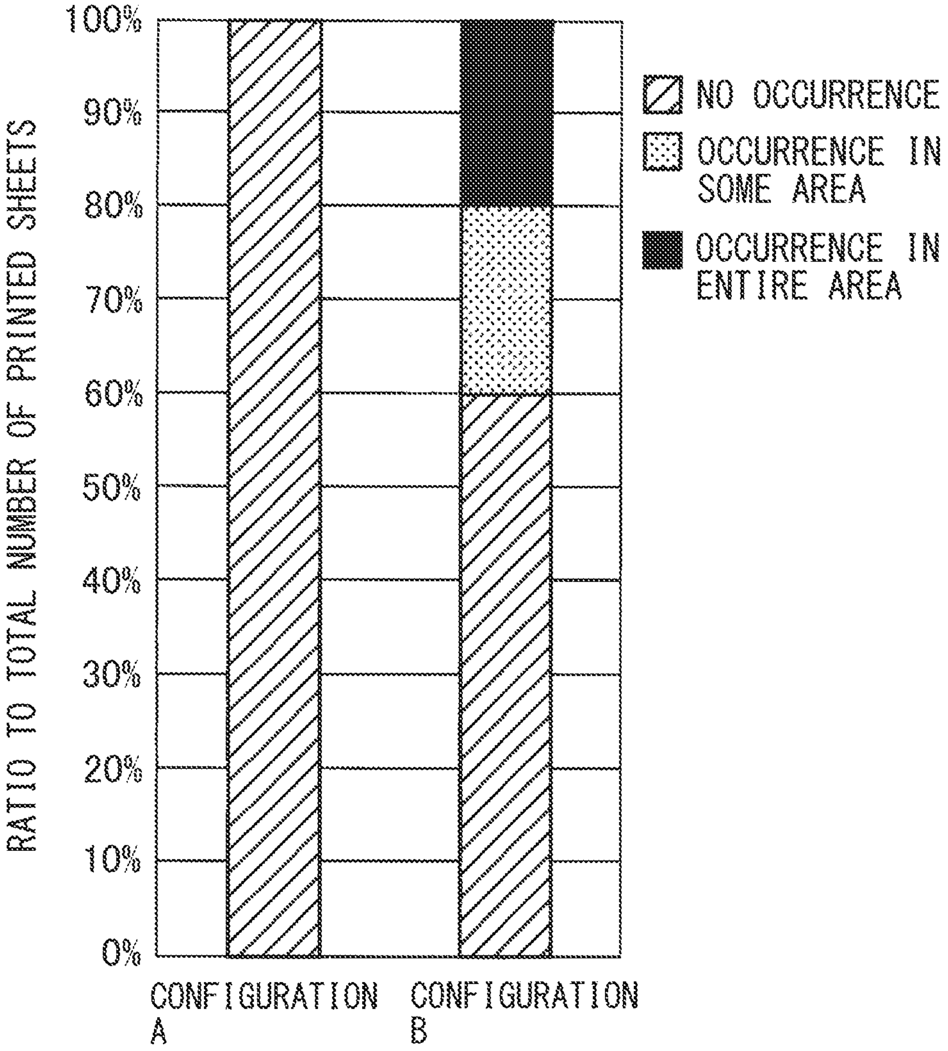
FIG. 8 is a graph illustrating evaluation results of deterioration of an image in the Embodiment and the Comparative Example.

Then, correspondence between the results obtained in the simulation and actual phenomena was investigated. Configurations as specified above were reproduced on actual machines and the wrinkle stretching effect of the recording material S upon printing using the recording material S of low stiffness (a thin paper) was verified. The results are shown in FIG. 8. The actual printed images were visually verified and evaluated at three levels in terms of image quality. A case in which there is no occurrence of image deterioration caused by the wrinkle of the recording material S is indicated by oblique lines, a case in which an occurrence of the deterioration of the image is verified in some areas of the recording material S is indicated by dots, and a case in which an occurrence of the deterioration of the image is verified in approximately an entire area of the recording material S is indicated by black. A vertical axis of FIG. 8 indicates a ratio of each of the above evaluation level to a total number of printed sheets.

In the Configuration B, the deterioration of the image occurred in about 40% of the total number of printed sheets, whereas in the Configuration A, the deterioration of the image did not occur on all of the printed recording materials S. Therefore, it is found that the wrinkle stretching effect of the recording material S is higher in the Configuration A than in the Configuration B. This is a similar trend to the result obtained in the simulation above, where the belt entering angle θ is larger in the Configuration A than in the Configuration B.

5. Crown Amount of the Separating Roller

Next, a relationship between the crown amount of the separating roller 42 and the belt entering angle θ will be described. As shown in FIG. 7 together with the above results, the belt entering angles θ were calculated in cases in which the crown amount of the separating roller 42 in the Configuration A was varied. The crown amounts of the separating roller 42 were set in 0.5 mm increments in a range from 0.5 mm to 2.0 mm. In addition, the inverted crown amount of the upstream roller 43 in the Configuration A was set in a range from 0.3 mm to 1.2 mm so as to make the peripheral lengths of the secondary transfer belt 40 stretched in the central portion and in the end portion in the rotational axis direction of the separating roller 42 be equal, respectively.

From FIG. 7, it can be found that there is a positive correlation between the crown amount of the separating roller 42 and the belt entering angle θ. This is considered to be due to the following reason. That is, as the crown amount of the separating roller 42 and the inverted crown amount of the upstream roller 43 change, an amount of deformation of the secondary transfer belt 40 in the upstream side of the secondary transfer roller 41 up to the upstream roller 43 entering inward at the central portion with respect to the rotational axis direction of the upstream roller 43 changes. By this, an amount of deformation of the secondary transfer belt 40 in the downstream side of the secondary transfer roller 41 up to the separating roller 42 spreading outside with respect to the widthwise direction of the secondary transfer belt 40 changes.

And from FIG. 7, it can be found that, with respect to simulation results of the belt entering angle θ, a result in a case in which the crown amount in the Configuration A is 1.0 mm approximately corresponds to a result in a case in which the crown amount in the Configuration B is 2.0 mm. This indicates that in the Configuration A, the crown amount of separating roller 42 may be reduced by half while maintaining the wrinkle stretching effect of the recording material S the same, compared to the Configuration B. In addition, it also indicates that in the Configuration A, the wrinkle stretching effect of the recording material S, which is equal to or more than in the Configuration B, can be obtained even if the crown amount is not as large as that of the Configuration B. Furthermore, by making the crown amount of the separating roller 42 and the inverted crown amount of the upstream roller 43 be smaller, an amount of deformation required to make the secondary transfer belt 40 contact closely to the peripheral surface of each roller becomes smaller. Therefore, it becomes possible to reduce the tension which needs to be imparted to the secondary transfer belt 40 and to ease load on the secondary transfer belt 40. Incidentally, although not limited to this, it is preferable to set the crown amount of the crown roller about 0.5 mm to 2.0 mm. In addition, the inverted crown amount of the inverted crown roller is set such that the peripheral lengths of the belt stretched in the central portion and the end portion with respect to the rotational axis direction of the crown roller are approximately equal, as described above.

The tension of the secondary transfer belt 40 is strongly related to a service life (durable print number) of the secondary transfer belt 40. In particular, in the case in which the rib regulating method is employed to suppress the shift of the secondary transfer belt 40 toward the widthwise direction, when the rib 401 is in contact with the flange 431, the concentrated stress is likely to be applied to the portion of the secondary transfer belt 40, which corresponds to the rib 401. In other words, as mentioned above, when the secondary transfer belt 40 is shifted to one side in the widthwise direction, the rib 401 is deformed by receiving reaction force from the flange 431 and pushes up the secondary transfer belt 40, therefore the concentrated stress becomes likely to be applied to the secondary transfer belt 40. And as this behavior is repeated, the deterioration of the secondary transfer belt 40 may progress. In the worst case, the fatigue failure may occur in the secondary transfer belt 40. In contrast to this, according to the present Embodiment, since the tension of the secondary transfer belt 40 can be reduced as described above, the above concentrated stress becomes eased and a number of printed pages before the above fatigue failure is expected to be increased.

Here, the reaction force which the rib 401 receives from the flange 431, which is a main cause of the fatigue failure, was calculated by simulation. To shorten analysis time, the flange 431 was excluded from an analysis model, and the reaction force received by the end portion in the rotational axis direction of the upstream roller 43 where the flange 431 is provided was set as a target of evaluation. As a result of the analysis, it is found that the reaction force received by the end portion in the rotational axis direction of the upstream roller 43 decreases as the tension of the secondary transfer belt 40 decreases. In general, since the fatigue failure is represented by a one-logarithmic graph of the concentrated stress versus a number of repetitions, the durable print number is expected to increase exponentially as the tension of the secondary transfer belt 40 decreases. In addition, in a case in which the tension of the secondary transfer belt 40 is set so that the concentrated stress on the secondary transfer belt 40 caused by the rib 401 is equal to or less than a fatigue limit of the material of the secondary transfer belt 40, it becomes possible to prevent the secondary transfer belt 40 from being broken due to the rib 401.

Even in a case in which the secondary transfer device 4 does not employ the rib regulating method, the service life of the secondary transfer belt 40 may be shortened if the tension of the secondary transfer belt 40 is high. In particular, when the crown roller and the inverted crown roller are used as the stretching rollers, the secondary transfer belt 40 is repeatedly subjected to loads caused by being deformed by these rollers. Therefore, if the high tension is imparted to the secondary transfer belt 40, the service life of the secondary transfer belt 40 may be shortened.

Incidentally, the shape of the first stretching roller is not limited to the crown shape (normal crown shape). The first stretching roller may be configured to include a part, at both end portions in the rotational axis direction, of which a diameter is smaller than a diameter of a central portion in the rotational axis direction. In addition, in the case in which the first stretching roller has a crown shape (normal crown shape), the shape is not limited to a shape which has a contour line of which diameter changes parabolically along the rotational axis. The shape of the contour line along the rotational axis may be of a hyperbolic, a suspension line, a circular arc, an elliptical arc, etc. In addition, the shape of the first stretching roller is not limited to a shape of which diameter changes continuously in the rotational axis direction. For example, the first stretching roller may be configured to include a rotation shaft which is formed of metal, etc., and a plurality of roller portions which is formed of resin, etc., which is disposed on the rotation shaft, and be configured as diameters of both end portions may be smaller than that of a central portion. In this case, for example, the roller portions may be disposed at the central portion and both end portions, and the roller portions at both end portions may be configured to have tapered shapes. Similarly, the shape of the second stretching roller is not limited to the inverted crown shape. The second stretching roller may be configured to include a part, at both end portions in the rotational axis direction, of which a diameter is larger than a diameter of a central portion in the rotational axis direction. In addition, in the case in which the second stretching roller has the inverted crown shape, the shape is not limited to a shape which has a contour line of which diameter changes parabolically along the rotational axis. The shape of the contour line along the rotational axis may be of a hyperbolic, a suspension line, a circular arc, an elliptical arc, etc. In addition, the shape of the second stretching roller is not limited to a shape of which diameter changes continuously in the rotational axis direction. For example, the second stretching roller may be configured to include a rotation shaft which is formed of metal, etc., and a plurality of roller portions which is formed of resin, etc., which is disposed on the rotation shaft, and be configured as diameters of both end portions may be larger than that of a central portion. In this case, for example, the roller portions may be disposed at the central portion and both end portions, and the roller portions at both end portions may be configured to have tapered shapes.

In addition, in the present Embodiment, the tension roller was provided in the secondary transfer device 4, which is urged by the urging means, however, it may be configured that all of the plurality of stretching rollers are provided in fixed positions so that sufficient tension is imparted to the secondary transfer belt 40 during rotation, for example.

In addition, the secondary transfer roller 41 may be urged by a spring (e.g., a compressed coil spring), which is an urging member as an urging means, when the secondary transfer roller 41 is in contact with the secondary transfer opposite roller 32. In this case, it becomes possible to form the secondary transfer portion N2 having a predetermined nip width that may be formed more stably since a position of the secondary transfer roller 41 is changed according to thickness, etc., of the recording material S which passes through the secondary transfer portion N2 and contact pressure of the secondary transfer roller 41 against the secondary transfer opposite roller 32 becomes approximately constant. Provided, it may also be configured as a position of the secondary transfer roller 41 is fixed to form the secondary transfer portion N2.

Thus, in the present Embodiment, the image forming apparatus 100 comprises the intermediary transfer member 31 configured to bear the toner image, the rotatable endless belt (secondary transfer belt) 40 configured to carry and convey the recording material, the transfer roller 41, which is provided on the inner peripheral surface side of the belt 40 and is in contact with the intermediary transfer member 31 via the belt 40, configured to form the transfer portion N2 to transfer the toner image from the intermediary transfer member 31 to the recording material S, the first stretching roller (separating roller) 42 provided adjacently upstream of the transfer roller 41 with respect to the rotational direction of the belt 40 and on the inner peripheral surface side of the belt 40 and configured to stretch the belt 40, the second stretching roller 43 provided adjacently downstream of the transfer roller 41 with respect to the rotational direction of the belt 40 and on the inner peripheral surface side of the belt 40 and configured to stretch the belt 40, wherein the first stretching roller 42 includes the part, at both end portions in the rotational axis direction, of which the diameter is smaller than the diameter of the central portion in the rotational axis direction in the area where the belt 40 is stretched, and the second stretching roller 43 includes the part, at both end portions in the rotational axis direction, of which the diameter is larger than the diameter of the central portion in the rotational axis direction in the area where the belt 40 is stretched. In the present Embodiment, the first stretching roller 42 has the crown shape of which the diameter decreases continuously from the central portion toward both end portions in the rotational axis direction, and the second stretching roller 43 has the inverted crown shape of which the diameter increases continuously from the central portion toward both end portions in the rotational axis direction. In addition, in the present Embodiment, the shape of the second stretching roller 43 is set such that the peripheral length of which the part of the belt 40 is stretched in the central portion with respect to the rotational axis direction of the first stretching roller 42 is substantially equal to the peripheral length of which the part of the belt 40 is stretched in both end portions with respect to the rotational axis direction of the first stretching roller 42. In addition, in the present Embodiment, the image forming apparatus 100 further comprises the third stretching roller (tension roller) 44 configured to stretch the belt 40 and provided on the inner peripheral surface side of the belt 40 downstream of the first stretching roller 42 and upstream of the second stretching roller 43 in the rotational direction of the belt 40. In addition, in the present Embodiment, the third stretching roller 44 is configured to impart tension to the belt 40. In addition, in the present Embodiment, intermediary transfer member 31 is the image bearing member configured to transfer the toner image transferred from the photosensitive drum 11 as another image beating member to the recording material S at the transfer portion N2, and the transfer roller 41 is in contact with the opposing member (secondary transfer opposite roller) 32, which is provided opposite to the transfer roller 41 across the intermediary transfer member 31 and the belt 40, via the intermediary transfer member 31 and the belt 40. In addition, in the present Embodiment, the belt 40 rotates by driving force being transmitted as the transfer roller 41 is driven and rotated.

As explained above, according to the present Embodiment, it is possible to obtain the wrinkle stretching effect of the recording material S which is carried and conveyed by the secondary transfer belt 40 and to improve the durability of the secondary transfer belt 40.

Embodiment 21

Next, another Embodiment of the present invention will be described. The basic configuration and operation of the image forming apparatus in the present Embodiment are the same as those of the image forming apparatus of the Embodiment 1. Therefore, in the image forming apparatus of the present Embodiment, with respect to elements having functions or configurations that are the same as or corresponding to the image forming apparatus of the Embodiment 1 will be labeled with the same reference numerals as the Embodiment 1, and detailed explanations will be omitted.

Figure 9:
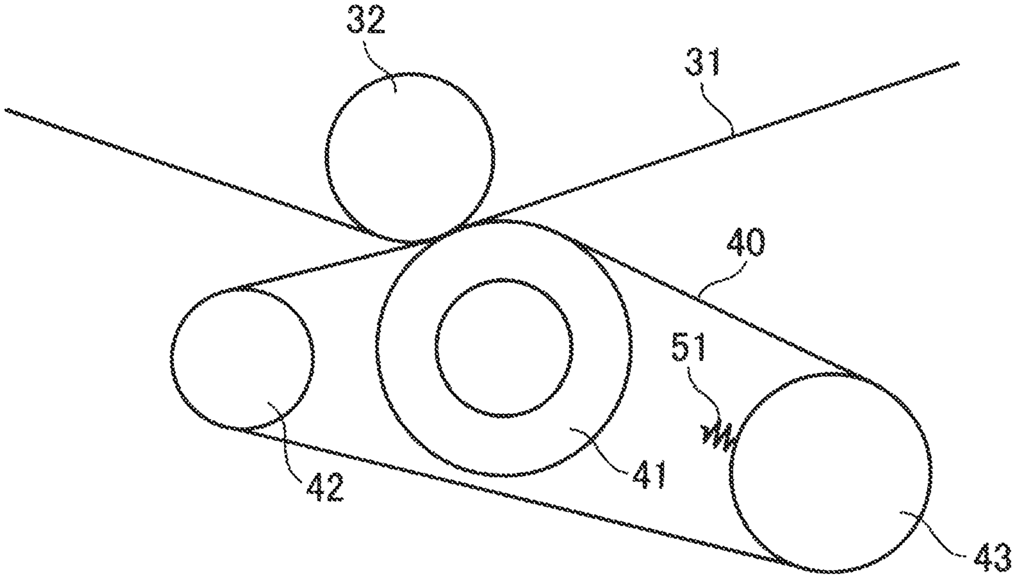
FIG. 9 is a schematic cross-sectional view of another Embodiment of the secondary transfer device.

FIG. 9 is a schematic cross-sectional view of a secondary transfer device 4 in the present Embodiment. In the present Embodiment, the secondary transfer device 4 is provided with three rollers as stretching rollers for a secondary transfer belt 40: a secondary transfer roller (transfer roller) 41, a separating roller (first stretching roller) 42, and an upstream roller (second stretching roller) 43 which has a function as a tension roller.

In the present Embodiment, the separating roller 42 is, similar to the Embodiment 1, provided adjacently downstream of the secondary transfer roller 41. In addition, also in the present Embodiment, the separating roller 42 is configured, similar to the Embodiment 1, to include a part, at both end portions in a rotational axis direction, of which a diameter is smaller than a diameter of the central portion in the rotational axis direction. In the present Embodiment, the separating roller 42 has a crown shape (normal crown shape) of which the diameter decreases continuously from the central portion toward both end portions in the rotational axis direction. In the present Embodiment, the separating roller 42 is constituted by a metal roller.

Also in the present Embodiment, the upstream roller 43 is, similar to the Embodiment 1, provided adjacently upstream of the secondary transfer roller 41. In addition, also in the present Embodiment, the upstream roller 43 is configured, similar to the Embodiment 1, to include a part, at both end portions in the rotational axis direction, of which a diameter is larger than a diameter of the central portion in the rotational axis direction. In the present Embodiment, the upstream roller 43 has an inverted crown shape of which the diameter increases continuously from the central portion toward both end portions in the rotational axis direction. In the present Embodiment, the upstream roller 43 is constituted by a metal roller. In addition, in the present Embodiment, the upstream roller 43 has the function as the tension roller which imparts tension to the secondary transfer belt 40. Therefore, in the present Embodiment, the upstream roller 43 is pressed in a direction from the inner peripheral surface side to the outer peripheral surface side of the secondary transfer belt 40 by a spring (compressed coil spring) 51, which is an urging member as an urging means.

In other words, the secondary transfer device 4 of the present Embodiment corresponds to a configuration in which the upstream roller 43 and the tension roller 44 in the secondary transfer device 4 of the Embodiment 1 are integrated. In addition, in the present Embodiment, the upstream roller 43 deforms the secondary transfer belt 40 forcibly along a peripheral surface of a crown shape of the separating roller 42 and a peripheral surface of an inverted crown shape of the upstream roller 43, due to the tension imparted to the secondary transfer belt 40 by the upstream roller 43 itself. As a result, the secondary transfer belt 40 runs with spreading from a central portion to both end portions in a widthwise direction as it goes from the upstream side to the downstream side of the secondary transfer roller 41. Thus, as described in the Embodiment 1, the wrinkle stretching effect of the recording material S can be obtained.

As described above, according to the present Embodiment, it is possible to obtain the same effect as the Embodiment 1, and becomes possible to lower cost and save space of the secondary transfer device 4 by reduction of a number of stretching rollers of the secondary transfer belt 40.

[Others]

As described above, the present invention has been described according to the specific Embodiments, however, the present invention is not limited to the above Embodiments.

In the Embodiments described above, the intermediary transfer member is an intermediary transfer belt constituted by an endless belt, however, it may be an intermediary transfer drum, for example, which is formed as a drum-shape by bonding a sheet (film) to a frame member. In this case, the secondary transfer roller is in contact with the secondary transfer opposite roller, which is provided opposite to and across the sheet constituting the intermediate transfer drum, via the sheet.

In addition, in the Embodiments described above, it is described using the cases in which the present invention is applied to the secondary transfer device which transfers the toner image from the intermediary transfer member as the image bearing member to the recording material, however, the present invention is not limited to these configurations. For example, in a monochrome image forming apparatus, the present invention may be applied to a transfer device which transfers a toner image from a photosensitive member as an image bearing member to a recording material.

According to the present invention, it is possible to obtain the wrinkle stretching effect of the recording material carried and conveyed by the transfer belt, and to improve the durability of the transfer belt.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2022-147473 filed on Sep. 15, 2022 and 2023-139391 filed on Aug. 29, 2023, which are hereby incorporated by reference herein in their entirety.

What is claimed is:

1. An image forming apparatus comprising:

an image bearing member configured to bear a toner image;

a first belt to which the toner image is transferred from the image bearing member;

a first transfer roller provided in contact with an inner surface of the first belt and configured to form a nip portion where the toner image borne by the image bearing member is transferred to a recording material;

an upstream roller provided adjacently upstream of the first transfer roller with respect to the rotational direction of the first belt and configured to stretch the first belt while in contact with the inner surface of the first belt;

a second belt configured to form the nip portion while in contact with an outer surface of the first belt and to convey the recording material;

a second transfer roller configured to form the nip portion between the second transfer roller and the first transfer roller through the second belt and to transfer the toner image borne by the first belt to the recording material;

a first stretching roller provided adjacently downstream of the second transfer roller with respect to a rotational direction of the second belt and configured to stretch the second belt while in contact with an inner surface of the second belt; and a second stretching roller provided adjacently upstream of the second transfer roller with respect to the rotational direction of the second belt and configured to stretch the second belt while in contact with the inner surface of the second belt, wherein when a line perpendicular to a line connecting a center of the first transfer roller and a center of the second transfer roller and passing through a center of the nip portion is defined as a nip line L1, a tangential line of the first stretching roller passing through the center of the nip portion and formed along the second belt is defined as a tangential line L3, a tangential line of the second stretching roller passing through the center of the nip portion and formed along the second belt is defined as a tangential line L2, an angle formed by the nip line L1 and the tangential line L2 is defined as $\varphi 1$, an angle formed by the nip line L1 and the tangential line L3 is defined as $\varphi 2$, and an angle formed between the first belt, which is stretched between the first transfer roller and the upstream roller, and the tangential line L2 is defined as $\varphi 3$, the first stretching roller, the second stretching roller, and the second transfer roller are disposed so as to satisfy $\varphi 1 \leq 30°$, $\varphi 2 \leq 30°$, and $\varphi 3 < \varphi 1$, and wherein the first stretching roller includes parts, at both end portions in a rotational axis direction, of which a diameter is less than a diameter of a central portion in the rotational axis direction in an area where the second belt is stretched, and the second stretching roller includes parts, at both end portions in the rotational axis direction, of which a diameter is greater than a diameter of a central portion in the rotational axis direction in an area where the second belt is stretched.

2. An image forming apparatus according to claim 1, wherein the first stretching roller has a crown shape of which the diameter decreases continuously from the central portion toward both end portions in the rotational axis direction, and wherein the second stretching roller has an inverted crown shape of which the diameter increases continuously from the central portion toward both end portions in the rotational axis direction.

3. An image forming apparatus according to claim 1, wherein a shape of the second stretching roller is set such that a peripheral length of which a part of the second belt is stretched in the central portion with respect to the rotational axis direction of the first stretching roller is substantially equal to a peripheral length of which a part of the second belt is stretched in the end portion with respect to the rotational axis direction of the first stretching roller.

4. An image forming apparatus according to claim 1, further comprising a third stretching roller configured to stretch the second belt while in contact with the inner surface of the second belt provided downstream of the first stretching roller and upstream of the second stretching roller with respect to the rotational direction of the second belt.

5. An image forming apparatus according to claim 4, wherein the third stretching roller is a tension roller for imparting tension to the second belt by an urging member being urged.

6. An image forming apparatus according to claim 1, wherein the second transfer roller is a driving roller for transmitting a driving force to rotate the second belt.

7. An image forming apparatus according to claim 1, wherein the first stretching roller and the second stretching roller are disposed such that a vertex of the first stretching roller is lower than a vertex of the second transfer roller and a vertex of the second stretching roller is higher than the vertex of the second transfer roller.

8. An image forming apparatus comprising:

an image bearing member configured to bear a toner image;

a first belt to which the toner image is transferred from the image bearing member;

a first transfer roller provided in contact with an inner surface of the first belt and configured to form a nip portion where the toner image borne by the image bearing member is transferred to a recording material;

a second belt configured to form the nip portion while in contact with an outer surface of the first belt and to convey the recording material;

a second transfer roller configured to form the nip portion between the second transfer roller and the first transfer roller through the second belt and to transfer the toner image borne by the first belt to the recording material;

a first stretching roller provided adjacently downstream of the second transfer roller with respect to a rotational direction of the second belt and configured to stretch the second belt while in contact with an inner surface of the second belt, the first stretching roller including parts, at both end portions in a rotational axis direction, of which a diameter is less than a diameter of a central portion in the rotational axis direction in an area where the second belt is stretched;

a second stretching roller provided adjacently upstream of the second transfer roller with respect to the rotational direction of the second belt and configured to stretch the second belt while in contact with the inner surface of the second belt, the second stretching roller including parts, at both end portions in the rotational axis direction, of which a diameter is greater than a diameter of a central portion in the rotational axis direction in an area where the second belt is stretched; and a third stretching roller configured to stretch the second belt while in contact with the inner surface of the second belt provided downstream of the first stretching roller and upstream of the second stretching roller with respect to the rotational direction of the second belt.

9. An image forming apparatus according to claim 8, wherein the first stretching roller has a crown shape of which the diameter decreases continuously from the central portion toward both end portions in the rotational axis direction, and wherein the second stretching roller has an inverted crown shape of which the diameter increases continuously from the central portion toward both end portions in the rotational axis direction.

10. An image forming apparatus according to claim 8, wherein the third stretching roller is a tension roller for imparting tension to the second belt by an urging member being urged.

11. An image forming apparatus according to claim 8, wherein the second transfer roller is a driving roller for transmitting a driving force to rotate the second belt.

12. An image forming apparatus according to claim 8, wherein the first stretching roller and the second stretching roller are disposed such that a vertex of the first stretching roller is lower than a vertex of the second transfer roller and a vertex of the second stretching roller is higher than the vertex of the second transfer roller.

* * * * *